US006421952B1

(12) United States Patent
Vascocu

(10) Patent No.: US 6,421,952 B1
(45) Date of Patent: Jul. 23, 2002

(54) INSECT ATTRACTING AND EXTERMINATING APPARATUS

(76) Inventor: Keith D. Vascocu, 151 Ucie Vascocu Rd., Robeline, LA (US) 71469

( * ) Notice: Subject to any disclaimer, the term of this patent is extended or adjusted under 35 U.S.C. 154(b) by 0 days.

(21) Appl. No.: 09/615,083

(22) Filed: Jul. 12, 2000

Related U.S. Application Data

(63) Continuation-in-part of application No. 09/243,700, filed on Feb. 3, 1999, now abandoned.
(60) Provisional application No. 60/077,748, filed on Mar. 12, 1998.

(51) Int. Cl.[7] ............................. A01M 1/04; A01M 1/22
(52) U.S. Cl. ........................................ 43/113; 43/112
(58) Field of Search ................................ 43/113, 112

(56) References Cited

U.S. PATENT DOCUMENTS

| | | | |
|---|---|---|---|
| 1,962,439 A | 6/1934 | Folmer et al. ................ | 43/112 |
| 2,061,458 A | 11/1936 | Folmer et al. ................ | 43/112 |
| 3,835,577 A | 9/1974 | Soulos ........................ | 43/112 |
| 3,950,886 A | 4/1976 | Newhall et al. .............. | 43/112 |
| 4,144,668 A | 3/1979 | Darncharnjitt ............... | 43/113 |
| 4,158,268 A | 6/1979 | DeYoreo ..................... | 43/112 |
| 4,422,015 A | 12/1983 | Nilssen ....................... | 43/112 |
| 4,754,570 A | 7/1988 | Bakke ......................... | 43/112 |
| 4,785,573 A | 11/1988 | Millard ........................ | 43/112 |
| 4,908,979 A | 3/1990 | Hostetter ..................... | 43/112 |
| 5,205,064 A | 4/1993 | Nolen .......................... | 43/112 |
| 5,255,468 A | 10/1993 | Cheshire, Jr. ................ | 43/113 |
| 5,259,153 A | 11/1993 | Olive et al. .................. | 43/113 |
| 5,272,831 A | 12/1993 | Willis .......................... | 43/112 |
| 5,301,456 A | 4/1994 | Jobin et al. .................. | 43/113 |
| 5,455,488 A | 10/1995 | Rhoades et al. ............. | 315/156 |
| 5,595,018 A | 1/1997 | Wilbanks ..................... | 43/112 |

Primary Examiner—Kurt Rowan
(74) Attorney, Agent, or Firm—Richard C. Litman

(57) ABSTRACT

An insect attracting and exterminating apparatus includes a body having an upper housing, a lower housing, and a rim which hangs over the lower housing a sufficient amount to shelter the lower housing from the weather. An inner electrical wire mesh and an outer electrical wire mesh are mounted in a spaced apart relationship in the lower housing. The inner and outer wire meshes are electrically connected to an AC power source and are spaced apart by electrical insulators, such as plastic, porcelain, etc., for killing insects in that area when activated. The upper housing is made out of firm material, such as metal, and is removably attached to a security light source by clamps or other known devices. The upper housing includes an AC-DC converter for converting AC voltage into DC voltage, and providing DC power to the inner electrical wire mesh and outer electrical wire mesh. The lower housing is made out of firm, clear material, such as perforated clear polybutylene, which protects the inner electrical wire mesh and the outer electrical wire mesh. The insect attracting and exterminating apparatus also includes elements for establishing electrical and mechanical connections with a source of 120 VAC electrical power.

16 Claims, 4 Drawing Sheets

INSECT ATTRACTING AND EXTERMINATING APPARATUS

CROSS REFERENCE TO RELATED APPLICATIONS

This is a continuation-in-part of application Ser. No. 09/243,700 filed on Feb. 3, 1999 now abandoned, which claims the benefit of U.S. Provisional Patent Application Ser. No. 60/077,748, filed Mar. 12, 1998.

BACKGROUND OF THE INVENTION

1. Field of the Invention

The present invention relates generally to an insect attracting and exterminating apparatus suitable for use in attracting and killing harmful weak flying insects, as well as providing illumination security.

2. Description of Related Art

Security lighting systems are widely used for prevention of crime and vandalism in many communities. These security systems are commonly used to monitor residential and business properties, particularly the areas encompassing entrances to buildings, during nighttime hours. In addition, there are many known devices designed to attract and kill insects. Devices that attract and kill insects have various names, including the colloquial terms "bug killer" and "bug zapper". Such devices generally destroy insects that are pests to humans. Entomological research suggests that members of various species of mosquitoes are attracted to light in various wavelengths. It is well known that light attracts many types of insects, including mosquitoes, so most of the prior devices include a light source as an attractant or lure.

The related art is represented by the following patents of interest.

U.S. Pat. No. 4,754,570, issued on Jul. 5, 1988 to Daniel O. Bakke, describes an electric bug killing apparatus. Bakke does not suggest an insect attracting and exterminating apparatus according to the claimed invention.

U.S. Pat. No. 4,785,573, issued on Nov. 22, 1988 to Lance L. Millard, describes a portable electronic insect controller. Millard does not suggest an insect attracting and exterminating apparatus according to the claimed invention.

U.S. Pat. No. 4,908,979, issued on Mar. 20, 1990 to Sherman E. Hostetter, describes an insect control assembly for retrofitting onto existing streetlights comprising an electrically conductive cover. Hostetter does not suggest an insect attracting and exterminating apparatus according to the claimed invention.

U.S. Pat. No. 5,259,153, issued on Nov. 9, 1993 to Billy B. Olive et al., describes an insect trap comprising a sticky liquid or other sticky substance accessible to a source of fleas to be trapped and a light source in the form of a solar or other artificial light energized light source. Olive et al. do not suggest an insect attracting and exterminating apparatus according to the claimed invention.

U.S. Pat. No. 5,272,831, issued on Dec. 28, 1993 to Candier A. Willis, describes an electrical circuit for operating a combination insect electrocution grid and outdoor lamp. Willis does not suggest an insect attracting and exterminating apparatus according to the claimed invention.

U.S. Pat. No. 5,455,488, issued on Oct. 3, 1995 to David P. Rhoades, et al., describes a light activated switch which can be inserted into an electrical connection, such as a lamp socket, and used to automatically make or break the electrical path as a function of a predetermined light condition. Rhoades, et al., do not suggest an insect attracting and exterminating apparatus according to the claimed invention.

None of the above inventions and patents, taken either singly or in combination, is seen to describe the instant invention as claimed.

SUMMARY OF THE INVENTION

The present invention is an insect attracting and exterminating apparatus suitable for use in attracting and killing harmful weak flying insects, as well as providing illumination security. The insect attracting and exterminating apparatus includes a body comprising an upper housing, a lower housing, and a rim which hangs over the lower housing a sufficient amount to shelter the lower housing from the weather. An inner electrical wire mesh and an outer electrical wire mesh are mounted in a spaced apart relationship in the lower housing. The inner and outer wire meshes are electrically connected to an AC power source and are spaced apart by means of electrical insulators, such as plastic, porcelain, etc., for killing insects in that area when activated. The upper housing is made out of firm material, such as metal, and is removably attached to a security light source by clamps or other known devices. The upper housing includes a AC-DC converter for converting incoming AC voltage into DC voltage, and providing DC power to the inner electrical wire mesh and outer electrical wire mesh. The lower housing is made out of firm, clear material, such as perforated clear polybutylene, which protects the inner electrical wire mesh and the outer electrical wire mesh. The upper and lower housings are water resistant and may be configured using any desirable color. In addition, the upper and lower housings are preferably weather resistant such that they will be resistant to fading, hail damage, etc. The insect attracting and exterminating apparatus may also include a durable cover, such as plastic, aluminum, or the like.

The security light source generally comprises a mounting base which could be attached to any suitable support, such as a wall, a utility pole, etc. The security light source includes a light, such as a mercury vapor bulb light capable of insertion respectively in a light holder supported by the mounting base. The mounting base also includes means for establishing electrical and mechanical connections with a source of 120 VAC electrical power. The insect attracting and exterminating apparatus may also include a dimmer switch to control the actual intensity of light emitted from the light.

The light holder has a tube portion having an open end. A light socket is installed in the tube portion for receiving a light. The tube portion includes means thereby allowing electrical wires to pass from the tube portion through the mounting base. The light holder is connected to the mounting base, and may be conveniently made at the far end of the tube portion.

The light, the electrical inner wire mesh, and the electrical outer wire mesh may be manually and/or automatically activated. The apparatus may include a switch means to enable a user to manually turn on and off the light, the electrical inner wire mesh, and the electrical outer wire mesh. Alternatively, the apparatus may include means to enable a user to automatically turn on and off the light, the electrical inner wire mesh, and the electrical outer wire mesh. However, the apparatus may also be configured to enable a user to set the apparatus into either a manual mode or an automatic mode. Means for automatically activating the light source and the electrical inner and outer wire meshes could include either a photosensitive element that responds to the presence or absence of ambient light, or a timing circuit. A known photosensitive element, such as a photo-electric eye, could be connected to a relay having contacts that selectively apply operating current to the light source and the AC-DC converter. The electrical inner wire mesh is preferably connected to positive DC power from the AC-DC converter, and the electrical outer wire mesh is preferably grounded, so that when an insect comes into contact with the inner wire mesh and the outer wire mesh electricity can flow through the insect and electrocute the insect. A known timing circuit could also be employed. Such a timing circuit normally includes a transformer, a rectifier, a voltage regulator, and a timer. The timing circuit could receive incoming AC power which is applied to terminals of the transformer. The secondary of the transformer would deliver low AC voltage to a full wave bridge rectifier comprising diodes. The resulting DC voltage would then be filtered and regulated by capacitors. The regulated DC voltage would then be applied to the timer which would remain active for a predetermined amount of time.

Accordingly, it is a principal object of the invention to provide an insect attracting and exterminating apparatus effective in attracting and killing harmful weak flying insects, as well as providing illumination security.

It is another object of the invention to provide an insect attracting and exterminating apparatus that is quiet and effective.

It is a further object of the invention to provide an insect attracting and exterminating apparatus that is automatically activated from dusk to dawn.

It is an object of the invention to provide improved elements and arrangements thereof in an insect attracting and exterminating apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Figure 1:
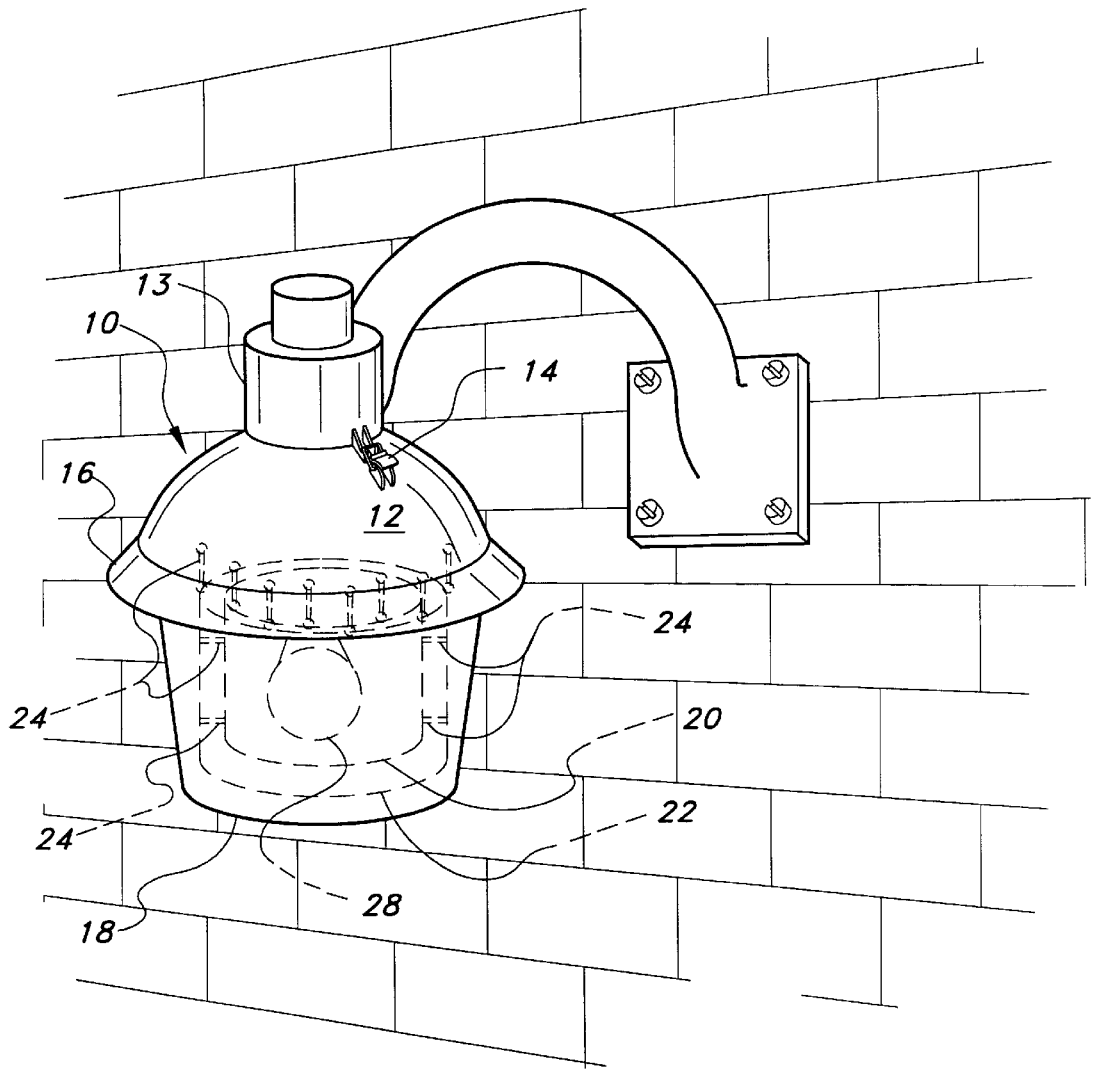
FIG. 1 is an environmental, perspective view of an insect attracting and exterminating apparatus according to the present invention.

The present invention is an insect attracting and exterminating apparatus suitable for use in attracting and killing harmful weak flying insects, as well as providing illumination security. The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiment.

Figure 2:
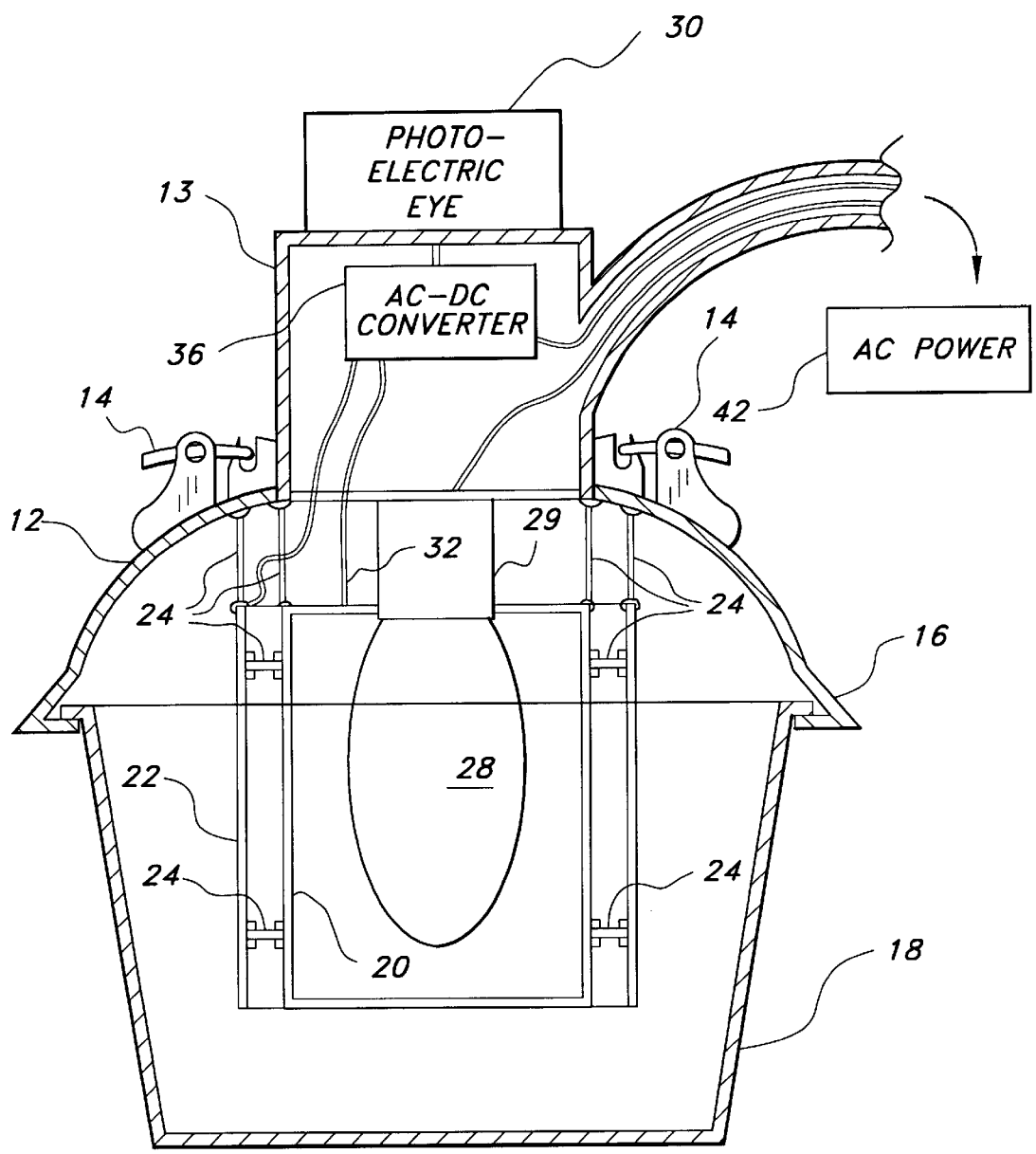
FIG. 2 is a cross-sectional view of the insect attracting and exterminating apparatus shown in FIG. 1.
Figure 3:
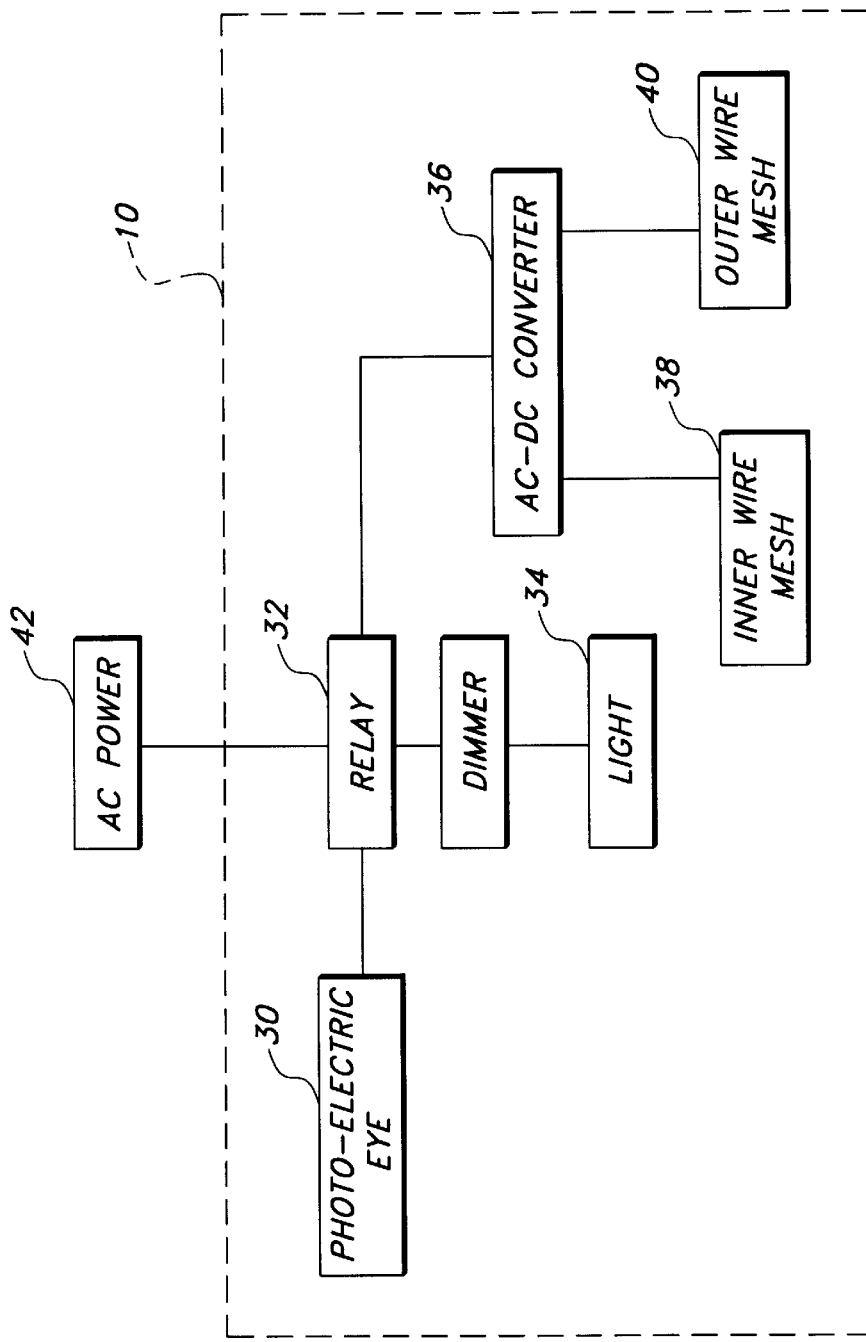
FIG. 3 is a block diagram of the insect attracting and exterminating apparatus shown in FIG. 1.
Figure 4:
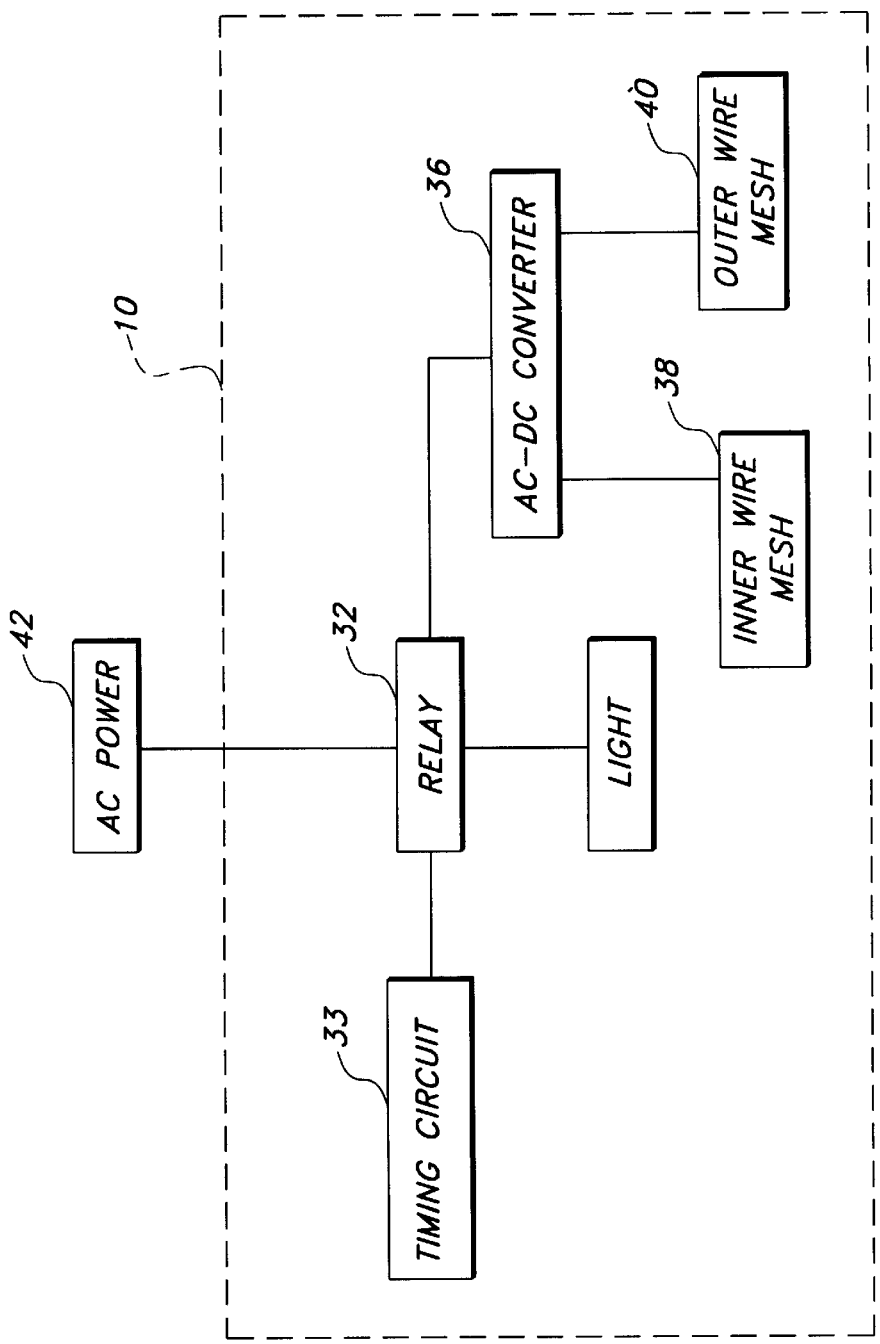
FIG. 4 is a block diagram of an insect attracting and exterminating apparatus according to the present invention.

Referring now to FIGS. 1–4, an insect attracting and exterminating apparatus 10 is shown having a body comprising an upper housing 12, a lower housing 18, and a rim 16 which hangs over the lower housing 18 a sufficient amount to shelter the lower housing 18 from the weather, such as about two inches. An inner electrical wire mesh 20 and an outer electrical wire mesh 22 are mounted in a spaced apart relationship in the lower housing 18. The inner and outer wire meshes 20,22 are electrically connected to an AC power source 42 via an AC-DC converter 36 and are spaced apart by means of electrical insulators, such as plastic, porcelain, etc., for killing insects in that area when activated. The upper housing 12 is made out of firm material, such as plastic, aluminum, etc., and is removably attached to a security light source by known means, such as clamps 14, screw means (not shown), etc. The upper housing includes an AC-DC converter 36 for converting AC voltage into DC voltage and providing DC power to the inner electrical wire mesh 20 and outer electrical wire mesh 22. The lower housing is made out of firm, clear material, such as perforated clear polybutalene, which protects the inner electrical wire mesh 20 and the outer electrical wire mesh 22. The upper and lower housings 12,18 are water resistant and may be colored, if desired, to add an additional optically attractive feature, as it has heretofore become known that particular colors, especially those ranging from a yellow to a yellowish green in the light spectrum, are particularly attractive to insects and if used for the structure of the device, may increase its efficiency in attracting insects. In addition, the upper and lower housings are preferably weather resistant such that they will be resistant to fading, hail damage, etc. The insect attracting and exterminating apparatus 10 may also include a durable cover, such as plastic, aluminum, or the like.

The security light source 13 is generally illustrated as comprising a mounting base which could be attached to any suitable support, such as a wall, a utility pole, etc. The security light source includes a light 28, such as a mercury vapor bulb light capable of insertion respectively in a light holder 29 supported by the mounting base. However, the light 28 may be any kind of light. The mounting base also includes means for establishing electrical and mechanical connections with a source of 120 VAC electrical power. The insect attracting and exterminating apparatus 10 may also include a dimmer switch to control the actual intensity of light emitted from the light 28.

The light holder 29 has a tube portion having an open end. A light socket is installed in the tube portion for receiving the light 28. The tube portion includes means thereby allowing electrical wires to pass from the tube portion through the mounting base. The light holder 29 is connected to the mounting base by connection. The connection to the light holder 29 may be conveniently made at the far end of the tube portion.

The light 28, the electrical inner wire mesh 20, and the electrical outer wire mesh 22 may be manually and/or automatically activated. The apparatus 10 may include a switch means to enable a user to manually turn on and off the light 28, the electrical inner wire mesh 20, and the electrical outer wire mesh 22. Alternatively, the apparatus 10 may include means to enable a user to automatically turn on and off the light 28, the electrical inner wire mesh 20, and the electrical outer wire mesh 22. However, the apparatus 10 may also be configured to enable a user to set the apparatus 10 into either a manual mode or an automatic mode. The light 28 during hours of darkness provides an attractant for many insects at some substantial distance from the apparatus 10. Means for automatically activating the light 28, the electrical inner wire mesh 20, and the electrical outer wire mesh 22 could include either a photosensitive element which responds to the presence or absence of ambient light, or a timing circuit. A known photosensitive element, such as a photo-electric eye 30, could be connected to a relay 32 having contacts that selectively apply operating AC current to the light 34 and the AC-DC converter 36. The photo-electric eye 30 automatically controls the on/off status of the light 28 during the evening and nittime hours. Once the photo-electric eye 30 senses that it is dark the photo-electric eye 30 will make sure that it is dark for a predetermined time interval, such as ten minutes before the photo-electric eye 30 does anything. This prevents intermittent dark/light periods from starting a cycle. The apparatus 10 may also include a delay turn-on circuit to allow the user to select a delay of a predetermined amount of time, such as anywhere from 1–4 hours in the turn-on of the light 28 after the photo-cell senses that it is dark. The electrical inner wire mesh 20 is preferably connected to positive DC power from the AC-DC converter 36, and the electrical outer wire mesh 22 is preferably grounded, so that when an insect comes into contact with the inner wire mesh and the outer wire mesh electricity can flow through the insect and electrocute the insect. A known timing circuit 33 could also be employed. Such a timing circuit normally includes a transformer, a rectifier, a voltage regulator, and a timer. The timing circuit could receive incoming 120 VAC power which is applied to terminals of the transformer. The secondary of the transformer would deliver low AC voltage to a full wave bridge rectifier comprising diodes. The resulting DC voltage would then be filtered and regulated by capacitors. The regulated DC voltage would then be applied to the timer which would remain active for a predetermined amount of time.

It is to be understood that the present invention is not limited to the embodiments described above, but encompasses any and all embodiments within the scope of the following claims.

I claim:

1. An insect attracting and exterminating apparatus comprising:
    an upper housing, the upper housing having a plurality of clamps for attaching the apparatus to a security light source;
    a lower housing having an insect receiving opening;
    a rim which hangs over said lower housing to shelter the lower said housing from weather;
    an inner electrical wire mesh for killing insects admitted into said lower housing connected to said lower housing;
    an outer electrical wire mesh for killing insects admitted into said lower housing connected to said lower housing, wherein said outer electrical wire mesh is grounded;
    a light source mounted in a light holder for attracting insects to the vicinity of said lower housing having a manual on-off switch associated therewith;
    means for establishing electrical and mechanical connections between a source of 120 VAC electrical power, said light source, said inner electrical wire grid and said outer electrical wire grid;
    an AC-DC converter for converting AC voltage into DC voltage and providing positive DC power to said inner electrical wire mesh and negative DC power to said outer electrical wire mesh; and,
    means for switching the operation of said light source, said electrical inner wire mesh, and said electrical outer wire mesh between automatic and manual control.

2. The insect attracting and exterminating apparatus according to claim 1, wherein said upper housing is made out of metal.

3. The insect attracting and exterminating apparatus according to claim 1, wherein said lower housing is made out of clear perforated polybutylene.

4. The insect attracting and exterminating apparatus according to claim 1, further comprising dimmer means to control the actual intensity of light emitted from said light source.

5. The insect attracting and exterminating apparatus according to claim 1, wherein said light source comprises a light holder and a light.

6. The insect attracting and exterminating apparatus according to claim 5, wherein said light is a mercury vapor bulb light.

7. The insect attracting and exterminating apparatus according to claim 1, wherein said means for switching between automatic and manual control includes a photosensitive element which responds to the presence or absence of ambient light.

8. The insect attracting and exterminating apparatus according to claim 1, wherein said means for switching between automatic and manual control includes a timing circuit.

9. An insect attracting and exterminating apparatus comprising:
    an upper housing, the upper housing having a plurality of clamps adapted for attaching the apparatus to a security light source;
    a lower housing having an insect receiving opening;
    a rim which hangs over said lower housing to shelter the lower said housing from weather;
    an inner electrical wire mesh for killing insects admitted into said lower housing connected to said lower housing;
    an outer electrical wire mesh for killing insects admitted into said lower housing connected to said lower housing, wherein said outer electrical wire mesh is grounded;
    a light source mounted in a light holder for attracting insects to the vicinity of said lower housing;
    an AC-DC converter for converting AC voltage into DC voltage and providing positive DC power to said inner electrical wire mesh and negative DC power to said outer electrical wire mesh;
    means for establishing electrical and mechanical connections between a source of 120 VAC electrical power, said light source, said inner electrical wire grid and said outer electrical wire grid, wherein said electrical inner wire mesh and said electrical outer wire mesh are connected to said upper housing and each other by insulators; and,
    means for switching the operation of said light source, said electrical inner wire mesh, and said electrical outer wire mesh between automatic and manual control.

10. The insect attracting and exterminating apparatus according to claim 9, wherein said upper housing is made out of metal.

11. The insect attracting and exterminating apparatus according to claim 9, wherein said lower housing is made out of clear perforated polybutylene.

12. The insect attracting and exterminating apparatus according to claim 9, further comprising dimmer means to control the actual intensity of light emitted from said light source.

13. The insect attracting and exterminating apparatus according to claim 9, wherein said light source comprises a light holder and a light.

14. The insect attracting and exterminating apparatus according to claim 13, wherein said light is a mercury vapor bulb light.

15. The insect attracting and exterminating apparatus according to claim 9, wherein said means for switching between automatic and manual control includes a photosensitive element which responds to the presence or absence of ambient light.

16. The insect attracting and exterminating apparatus according to claim 9, wherein said means for switching between automatic and manual control includes a timing circuit.

\* \* \* \* \*